2,826,552

WATER TREATING AND CLEANING COMPOSITION

Paul W. Bonewitz and Elmer H. Fults, Burlington, and Sebern W. Hockett, Mount Pleasant, Iowa, assignors to Bonewitz Chemicals, Inc., Burlington, Iowa, a corporation of Iowa No Drawing. Application February 19, 1954
Serial No. 411,546

8 Claims. (Cl. 252—156)

The present invention relates to novel water treating compositions and methods of using the same in the treatment of water employed for industrial and domestic purposes. More particularly, the invention is concerned with novel improvements in the compositions and methods described and claimed in our copending application, Serial No. 183,658, filed September 7, 1950, now Patent No. 2,678,303, issued May 11, 1954, the subject matter of which is incorporated herein by reference.

Our above-mentioned copending application Serial No. 183,658 is concerned with certain novel mixtures of alkali metal caustic, i. e., sodium or potassium hydroxide, and dextrin, or the reaction products thereof, which were found to be capable of sequestering hard water salts and preventing precipitation thereof in a highly effective manner. As indicated in said application, the advantages of these mixtures, apparently, are due to the sequestering effect of the dextrin in the presence of caustic as demonstrated by actual field use and by laboratory testing of the invention. That is, the metal ions of the hard water salts in the water being treated are apparently reacted with the dextrin (as water-soluble reaction products) in the presence of the caustic. In this way, the metal salts and the like in the water become solubilized and the caustic is free to exert an optimum cleaning effect without interference. Also, it appears that the dextrin, in the presence of the caustic, exerts a cleaning effect by reason of its sequestering action. In other words, the calcium, magnesium, iron, nickel, copper, aluminum, and like metal ions, normally encountered in various types of waters, are sequestered into stable soluble structures by the dextrin in the presence of the caustic, and the caustic is thus enabled to operate more effectively as a cleaning agent and is assisted in this respect by the presence of the dextrin.

The results obtained by the use of mixtures as described in Serial No. 183,658 were surprising in view of the well-known precipitating action of caustic and the coagulating effect of dextrin where either of these substances has been used without the other in the treatment of water, especially, water having relatively high temperatures, e. g., 140° to 170° F., as encountered in bottle washing, or even boiling water. Nevertheless, in practical operation, it has been found that only a relatively small amount of dextrin, e. g., as low as 0.5 part of dextrin for 100 parts by weight of caustic-dextrin mixture, need be employed to permit the successful sequestering of hard water salts.

We have now discovered that even more surprising and beneficial results can be obtained if a portion or all of the dextrin in the caustic-dextrin mixtures of Serial No. 183,658 is replaced by an alkali metal, or alkaline earth metal, lignosulfonate, particularly sodium or calcium lignosulfonate, with the sodium salt being preferred.

The exact reason for the unexpected improvement referred to above is not completely understood. However, it is clear that the dextrin, caustic and lignosulfonate mutually coact to give the desired results. In other words, a synergistic effect is obtained, this being apparent from the fact that, when using a mixture of dextrin and lignosulfonate, according to the present invention, water of a substantially high degree of hardness can be satisfactorily treated than is possible using equal amounts of dextrin or lignosulfonate alone under otherwise equivalent conditions.

As the lignosulfonate constituent of the present compositions, there may be used any of the available forms of sodium and calcium lignosulfonate, or mixtures thereof. Thus, as typically suitable lignosulfonates, there may be mentioned the products which are commercially available as Marasperse N (neutral sodium lignosulfonate), Marasperse C (calcium lignosulfonate), and Marasperse B (sodium lignosulfonate).

The amount of dextrin replaced by the lignosulfonate according to the invention can be varied with advantage over a relatively wide range. Thus, while equal proportions of lignosulfonate and dextrin are preferred, from 20 to 80% by weight of the dextrin-lignosulfonate content may be lignosulfonate.

The total dextrin-lignosulfonate content in the products of the invention, on a dry weight basis, amounts to from about 0.5 to 50 parts per 100 parts of the mixture of caustic, dextrin and lignosulfonate. Accordingly, the present products can be defined as comprising: caustic alkali selected from the group consisting of sodium hydroxide, potassium hydroxide and ammonium hydroxide, and dextrin, and a lignosulfonate selected from the group consisting of sodium and calcium lignosulfonates, in amounts sufficient to sequester hard water salts and prevent precipitation thereof, whereby the cleaning action of the caustic is not interfered with, the ratio of said caustic to the dextrin-lignosulfonate content or lignosulfonate content being between about 50 and 99.5 parts caustic to between about 50 and 0.5 parts dextrin and lignosulfonate, or lignosulfonate alone, by weight on a dry basis. Preferably, the ratio of caustic to dextrin and lignosulfonate, or lignosulfonate is between about 75 to 98 parts caustic to between about 25 and 2 parts dextrin and lignosulfonate, or lignosulfonate on a dry basis.

Except for the inclusion of the lignosulfonate, the present products may be made up in the manner described in Serial No. 183,658. Thus, as the dextrin constituent, there may be used any of the available forms of dextrin, including that obtained from cassava, potatoes, corn, sago, rice, wheat, and other types of starch plants, grain, vegetable and fruit sources by fermentation, torrefaction, acid degradation and other conventional processes.

As indicated in Serial No. 183,658, the lower the value of "$n$" in the dextrin molecule $(C_6H_{10}O_5)_n$, the more effective is the dextrin in the presence of the caustic and lignosulfonate. In this connection, it will, of course, be appreciated that the term "dextrin" includes the use of dextrin as such or compounds which, in the presence of water and caustic, react to form dextrin or are hydrolyzed to form dextrinic acid ions, such as the dextrinates, e. g., sodium or potassium, calcium and ammonium dextrinates.

The unique advantages of the invention are further emphasized by the following comparative data showing the relative sequestering properties of (A) caustic soda-dextrin-sodium ligno-sulfonate compositions according to the invention; (B) caustic soda-sodium ligno-sulfonate compositions, and (C) caustic soda-dextrin compositions using synthetic hard water for test purposes in which the hardness constituents are two-thirds calcium and one-third magnesium. The maximum hardness which could be sequestered, as stated below, was determined by adding each composition to waters of increasing hardness and boiling until it was impossible to obtain a clear solution.

COMPOSITIONS A

| Parts by Weight | | Maximum Water Hardness Sequestered, Grains/gal. |
|---|---|---|
| Caustic Soda | Dextrin Sodium Lignosulfonate (equal parts) | |
| 99 | 1 | 19 |
| 98 | 2 | 31 |
| 97 | 3 | 40 |
| 96 | 4 | 44 |
| 95 | 5 | 47 |
| 94 | 6 | 50 |
| 93 | 7 | 55 |
| 92 | 8 | 65 |
| 91 | 9 | 72 |
| 90 | 10 | 76 |
| 89 | 11 | 82 |
| 88 | 12 | 90 |
| 87 | 13 | 91 |
| 86 | 14 | 92 |
| 85 | 15 | 94 |
| 84 | 16 | 96 |
| 83 | 17 | 99 |

COMPOSITIONS B

| Parts by Weight | | Maximum Water Hardness Sequestered, Grains/gal. |
|---|---|---|
| Caustic Soda | Sodium Lignosulfonate Marasperse B | |
| 99 | 1 | 10 |
| 98 | 2 | 22 |
| 97 | 3 | 30 |
| 96 | 4 | 36 |
| 95 | 5 | 39 |
| 94 | 6 | 46 |
| 93 | 7 | 49 |
| 92 | 8 | 55 |
| 91 | 9 | 61 |
| 90 | 10 | 66 |
| 89 | 11 | 77 |
| 88 | 12 | 82 |
| 87 | 13 | 83 |
| 86 | 14 | 84 |
| 85 | 15 | 85 |
| 84 | 16 | 87 |
| 83 | 17 | 89 |

COMPOSITIONS C

| Parts by Weight | | Maximum Water Hardness Sequestered, Grains/gal. |
|---|---|---|
| Caustic Soda | Dextrin | |
| 99 | 1 | 10 |
| 98 | 2 | 22 |
| 97 | 3 | 23 |
| 96 | 4 | 25 |
| 95 | 5 | 26 |
| 94 | 6 | 29 |
| 93 | 7 | 33 |
| 92 | 8 | 40 |
| 91 | 9 | 53 |
| 90 | 10 | 59 |
| 89 | 11 | 61 |
| 88 | 12 | 64 |
| 87 | 13 | 66 |
| 86 | 14 | 69 |
| 85 | 15 | 72 |
| 84 | 16 | 76 |
| 83 | 17 | 78 |

The foregoing data clearly show the synergistic effect obtained by combining caustic, dextrin and lignosulfonate. For example, from the results obtained, using one part sodium lignosulfonate and 99 parts caustic, or one part dextrin and 99 parts caustic, it would be expected that at best a composition comprising 99 parts caustic, 0.5 part dextrin and 0.5 part sodium lignosulfonate would be satisfactory for treating water hardness up to only 10 grains per gallon rather than 19 grains per gallon.

It will be appreciated that while only compositions containing equal parts of dextrin and sodium lignosulfonate are compared above with dextrin-caustic and lignosulfonate-caustic mixtures, substantially equivalent results are obtained using calcium lignosulfonate with dextrin and varying proportions of the lignosulfonate and dextrin. Similarly, it will be appreciated that the hardness figures given above will vary, dependent upon whether the water treated is naturally hard water or synthetic hard water. In any event, however, the compositions of the invention show, in all cases, a superiority over products containing only the dextrin or the lignosulfonate.

The products of the invention may be made in any desired manner. For example, the caustic, lignosulfonate and dextrin, all in dry powder form, may simply be mixed together in the desired proportions. Alternately, the dextrin and lignosulfonate in powder form may be added to aqueous caustic solutions, e. g., 25 or 50% aqueous caustic solutions.

The following examples, wherein the parts and percentages referred to are by weight, further illustrate various compositions, and procedures for producing same, according to the present invention. It will be understood, however, that these specific examples are not intended to limit the invention, but merely indicate various preferred embodiments thereof, since numerous changes and modifications within the scope of the invention will become apparent to those skilled in the art.

Example I

Dry caustic soda, dry dextrin obtained from potatoes ("Potato Flaxen Dextrin") and sodium lignosulfonate (Marasperse B) were mixed together as powder or granules, using about 1½ parts dextrin, 1½ parts sodium lignosulfonate and 97 parts caustic.

The resulting mixture is suitable for the treatment of water in varying amounts, dependent primarily upon the causticity requirements for the particular use. Thus, for example, in bottle washing, about 3 pounds of this mixture for each 10 gallons of water satisfactorily takes care of an extreme condition of 35 grain water or even higher. This compares with an optimum of 30 grain natural water sequestered with a similarly prepared composition containing 97 parts caustic and 3 parts dextrin.

Example II

For the purpose of preparing an aqueous solution, 98.5 parts of 25% aqueous caustic soda solution at room temperature were added with agitation to one part of dry powdered dextrin and 0.5 part dry powdered sodium lignosulfonate (Marasperse B). The dextrin and sodium lignosulfonate dissolved in the water of the aqueous caustic solution to give a solution capable for use according to the invention.

Example III 90 parts caustic soda and 10 parts sodium lignosulfonate were mixed together as powder or granules and added to 66 grain water as in Example I. The hard water salts were satisfactorily sequestered.

Example IV

A dry product was prepared according to the foregoing examples containing 80 parts caustic soda and 4 parts dextrin and 16 parts sodium lignosulfonate on a dry basis. The resulting product was capable of completely sequestering the calcium and magnesium salts of 100 grain synthetic hard water.

Example V

A dry product was prepared according to the foregoing examples containing 80 parts caustic soda and 16 parts dextrin and 4 parts sodium lignosulfonate on a dry basis. The resulting product was capable of completely sequestering the calcium and magnesium salts of 100 grain synthetic hard water.

It will be appreciated that the compositions of the invention can include other ingredients which do not defeat the desired sequestering characteristics of the caustic, dextrin and sodium or calcium lignosulfonate. Thus, for example, in some cases, it is useful to employ compatible wetting agents in order to reduce the surface tension of the aqueous solution. This assures faster penetration of the soil and quicker drainage from the surface being treated. Conventional wetting agents are used for this purpose, preferably in amount of from 0.5 to 5 parts by weight, although larger amounts thereof may also be used.

Typically suitable wetting agents are:

ANIONIC WETTING AGENTS

1. Tergitol 08—Sodium sulfate derivative of 2-ethyl hexanol-1.
2. Tergitol 4—Sodium sulfate derivative of 7-ethyl-2-methylundecanol-4.
3. Nacconol NRSF—Alkyl aryl sulfonate.
4. Stepan DS60—Sodium alkyl aryl sulfonate (Stepan Chemical Co., Chicago).

NON-IONIC WETTING AGENTS

1. Igepal CA Extra—Alkyl aryl polyethylene glycol ether.
2. Sterox CD—Polyoxyethylene ether.
3. Triton X–100—Alkylated aryl polyether alcohol.
4. Igepal CO–880—Alkyl aryl polyoxyethylene glycol (General Dyestuff Corporation).

Example VI

This example illustrates the production of a composition including a wetting agent. Accordingly, a mixture was prepared as in Example IV above, except that there were used about 80 parts caustic soda or caustic potash, 9 parts dextrin and 9 parts calcium or sodium lignosulfonate and 2 parts of one of the above-mentioned wetting agents, namely, Igepal CO–880 on a dry basis. The resulting product will completely sequester 100 grain synthetic hard water and will be found particularly valuable for cleaning belly boxes in packing plants and ammonia condensers.

As indicated by the foregoing examples, the products of the invention may be used in the treatment of water, e. g., in bottle washing or vacuum pan cleaning, either in the form of dry mixtures or as aqueous solutions, as described in the above example. Additionally, the aqueous solutions, as described above, may be converted into granular products in any convenient manner, e. g., by using a Dopp kettle or other suitable granulating means. Particles or granules of caustic coated and impregnated with dextrin and the lignosulfonate or the lignosulfonate only may also be prepared by spraying caustic particles with an aqueous solution of dextrin and the lignosulfonate or the lignosulfonate with or without wetting agents, as described. This is illustrated by the following example:

Example VII

About 89 parts of dry caustic soda granules, 3 parts dry sodium lignosulfonate and 3 parts dry dextrin were placed in an agitator or mixer and then sprayed with about 5 parts of an aqueous solution comprising 20% sodium lignosulfonate, 76% water and 2% anionic wetting agent, namely, Stepan DS60, and 2% non-ionic wetting agent, namely, Igepal CO–880. This product is added to warm or cold water and dissolves readily therein.

While we have illustrated the invention using caustic soda, it is to be understood that ammonium hydroxide and potassium hydroxide may be substituted for the caustic soda in the foregoing examples with satisfactory results. Mixtures of these various caustic materials may be used in the same proportions as indicated in the examples.

The concentrations of aqueous solutions used for preparing the various products of the invention as described are not in any sense limiting, since any concentration of aqueous caustic, lignosulfonate or dextrin may be satisfactorily used. However, generally speaking, from 25 to 50% caustic solutions are used, and the most economical and practical products are usually those containing about 94 to 97 parts caustic and a total of about 3 to 6 parts dextrin and lignosulfonate, the latter two ingredients being present in about equal amounts, e. g., 2 parts each, or different amounts, such as 4 parts lignosulfonate to 2 parts dextrin or vice versa.

As explained, the compositions of this invention are added to water to solubilize the metal salts thereof and render the water useful for cleaning purposes, e. g., on metal and glass surfaces, food processing equipment, in the textile industry and in commercial laundry work. This invention is particularly useful where reliance is had upon caustic for processing or cleaning and the sequestering action is not only effective on the objectionable water salts, but, in addition, these new products attack the scale and soil to loosen, remove and solubilize the same from surfaces being cleaned.

Products prepared in accordance with this invention will sequester hard water salts when used in varying caustic concentrations, i. e., in water having a causticity of from about 0.25% $Na_2O$ upward, and this result is obtained at all temperatures including cases where the water is boiling. It should also be noted that the products of the invention aid in the reduction of scale and removal of scales, such as calcium carbonate, sulfates and mixtures of the same. Moreover, the present products substantially reduce corrosion on zinc or tin and have good de-rusting properties and degreasing characteristics. For instance, the invention is useful in cleaning trucks and trolleys in meat packing plants, and, in fact, the products of the invention are ideal for use in food plants generally.

In using the present products, they may be added to the wash water, or other water to be treated, in varying amounts, depending primarily upon the nature of the water. Generally, however, satisfactory results are obtained if sufficient of these products are used to give a total concentration of 0.0015 to 3% of the combination of dextrin and the lignosulfonate or the lignosulfonate in the water.

It will be appreciated that various modifications of the invention, as described above, may be made without deviating from the scope of the invention, as defined in the following claims, wherein we claim:

1. A dry water-soluble, water treating and cleaning composition comprising dextrin, a lignosulfonate selected from the group consisting of sodium and calcium lignosulfonate and sodium hydroxide, from 20 to 80% by weight of the dextrin-lignosulfonate content being lignosulfonate, the ratio of the sodium hydroxide to the total dextrin-lignosulfonate content being between about 50 to 99.5 parts sodium hydroxide to between about 0.5 to 50 parts dextrin and lignosulfonate by weight on a dry basis.

2. The composition of claim 1, wherein said lignosulfonate is sodium lignosulfonate.

3. The composition of claim 1, containing equal parts by weight of dextrin and sodium lignosulfonate.

4. A dry water-soluble, water treating and cleaning composition comprising dextrin, a lignosulfonate selected from the group consisting of sodium and calcium lignosulfonate and potassium hydroxide, from 20 to 80% by weight of the dextrin-lignosulfonate content being lignosulfonate, the ratio of the potassium hydroxide to the total dextrin-lignosulfonate content being between about 50 to 99.5 parts potassium hydroxide to between about 0.5 to 50 parts dextrin and lignosulfonate by weight on a dry basis.

5. A water-soluble, water treating and cleaning composition comprising as the predominating cleansing agents a lignosulfonate selected from the group consisting of sodium and calcium lignosulfonate and sodium hydroxide, the ratio of the sodium hydroxide to the total lignosulfonate content being between about 50 to 99.5 parts sodium hydroxide to between about 0.5 to 50 parts lignosulfonate by weight on a dry basis.

6. The composition of claim 5, wherein said lignosulfonate is sodium lignosulfonate.

7. A water-soluble, water treating and cleaning composition comprising as the predominating cleansing agents a lignosulfonate selected from the group consisting of sodium and calcium lignosulfonate and potassium hydroxide, the ratio of the potassium hydroxide to the total lignosulfonate content being between about 50 to 99.5 parts potassium hydroxide to between about 0.5 to 50 parts lignosulfonate by weight on a dry basis.

8. A cleaning composition comprising an aqueous solution of dextrin, a lignosulfonate selected from the group consisting of sodium and calcium lignosulfonate, caustic alkali in an amount equivalent to at least about 0.25% $Na_2O$ and selected from the group consisting of sodium hydroxide, potassium hydroxide and ammonium hydroxide, the ratio of the caustic to the total dextrin-lignosulfonate content being between about 50 to 99.5 parts caustic to between about 0.5 to 50 parts dextrin and lignosulfonate by weight on a dry basis, from 20 to 80% by weight of the dextrin-lignosulfonate content being lignosulfonate.

References Cited in the file of this patent

UNITED STATES PATENTS

| | | |
|---|---|---|
| 2,220,950 | Bird | Nov. 12, 1940 |
| 2,505,457 | Bird | Apr. 25, 1950 |
| 2,528,351 | Farber | Oct. 31, 1950 |
| 2,575,298 | Ryznar | Nov. 13, 1951 |
| 2,576,418 | Salvesen et al. | Nov. 27, 1951 |
| 2,678,303 | Bonewitz et al. | May 11, 1954 |
| 2,744,866 | Kahler | May 8, 1956 |

FOREIGN PATENTS

| | | |
|---|---|---|
| 566,394 | Great Britain | Dec. 28, 1944 |

OTHER REFERENCES

Ser. No. 413,450, Hustinx (A. P. C.), published May 25, 1943.